US012587358B2

(12) United States Patent

Shin et al.

(10) Patent No.: US 12,587,358 B2

(45) Date of Patent: Mar. 24, 2026

(54) APPARATUS FOR HOMOMORPHIC ENCRYPTION OF CATEGORICAL DATA AND METHOD FOR THEREOF

(71) Applicant: CRYPTO LAB INC., Seoul (KR)

(72) Inventors: Junbum Shin, Suwon-si (KR); Garam Lee, Seoul (KR); Younggi Lee, Seoul (KR)

(73) Assignee: CRYPTO LAB INC., Seoul (KR)

( * ) Notice: Subject to any disclaimer, the term of this patent is extended or adjusted under 35 U.S.C. 154(b) by 108 days.

(21) Appl. No.: 18/637,009

(22) Filed: Apr. 16, 2024

(65) Prior Publication Data

US 2025/0030537 A1    Jan. 23, 2025

(30) Foreign Application Priority Data

Jul. 18, 2023    (KR) ......................... 10-2023-0093388

(51) Int. Cl.
*H04L 9/00* (2022.01)
*G06F 17/10* (2006.01)

(52) U.S. Cl.
CPC .............. *H04L 9/008* (2013.01); *G06F 17/10* (2013.01); *H04L 2209/04* (2013.01); *H04L 2209/46* (2013.01)

(58) Field of Classification Search
CPC ................. H04L 9/008; H04L 2209/04; H04L 2209/46; G06F 17/10
See application file for complete search history.

(56) References Cited

U.S. PATENT DOCUMENTS

2021/0248263 A1* 8/2021 van Liesdonk ..... G06F 21/6227
2021/0357521 A1* 11/2021 Trepetin .............. G06F 21/6254

* cited by examiner

*Primary Examiner* — Ellen Tran

(74) *Attorney, Agent, or Firm* — Steinfl + Bruno LLP

(57)    ABSTRACT

Disclosed is an electronic apparatus. The electronic apparatus includes a memory configured to store at least one instruction and store a plurality of categorical data whose values are expressed as a plurality of classes for one category, and a processor configured to execute the at least one instruction to generate the plurality of categorical data into one homomorphic encrypted message, in which the processor is configured to generate a categorical column in which homomorphically encrypted data for each of the plurality of categorical data is located in a plurality of slots, generate mask columns corresponding to each of the plurality of classes to correspond to the number of the plurality of classes, and generate the homomorphic encrypted message by combining the categorical column and the plurality of mask columns.

17 Claims, 8 Drawing Sheets

| Categorical Col | class1 | class2 | class3 | 400 | NumCol 510 | | NumCol_masked (class2) 520 |
|---|---|---|---|---|---|---|---|
| 1 | 1 | 0 | 0 | | $X_0$ | | 0 |
| 2 | 0 | 1 | 0 | | $X_1$ | | $X_1$ |
| 1 | 1 | 0 | 0 | | $X_2$ | | 0 |
| ⋮ | ⋮ | ⋮ | ⋮ | | ⋮ | | ⋮ |
| 2 | 0 | 1 | 0 | | $X_{k-1}$ | | $X_{k-1}$ |
| 3 | 0 | 0 | 1 | | $X_k$ | | 0 |
| 1 | 1 | 0 | 0 | | $X_{k+1}$ | | 0 |
| ⋮ | ⋮ | ⋮ | ⋮ | | ⋮ | | ⋮ |
| 3 | 0 | 0 | 1 | | $X_{N-2}$ | | 0 |
| NA | 0 | 0 | 0 | | $X_{N-1}$ | | 0 |
| NA | 0 | 0 | 0 | | $X_N$ | | 0 |

APPARATUS FOR HOMOMORPHIC ENCRYPTION OF CATEGORICAL DATA AND METHOD FOR THEREOF

CROSS-REFERENCE TO RELATED APPLICATION(S)

This application is claiming priority under of a Korean patent application number 10-2023-0093388, filed on Jul. 18, 2023, in the Korean Intellectual Property Office, the disclosure of which is incorporated by reference herein in its entirety.

BACKGROUND

Field

The present disclosure relates to an apparatus for homomorphic encryption of categorical data and method for thereof, and more particularly, to an electronic apparatus and method capable of generating homomorphic encrypted message for categorical data to increase operation efficiency during statistical operation of the homomorphic encrypted message.

Description of the Related Art

As communication technology develops and electronic apparatuses spread, efforts are continuously made to maintain communication security between the electronic apparatuses. Accordingly, encryption/decryption technology is used in most communication environments.

When messages encrypted by the encryption technology are delivered to the other party, the other party needs to perform decryption in order to use the messages. In this case, the other party wastes resources and time in the process of decrypting the encrypted data. In addition, when the third party hacks messages while the other party temporarily decrypts the messages for an operation, there is a problem in that the messages may be easily leaked to the third party.

In order to solve this problem, a homomorphic encryption method is being studied. According to the homomorphic encryption, even if the operation is performed on encrypted messages themselves without decrypting the encrypted information, it is possible to obtain the same result as the encrypted value after the operation is performed on a plaintext. Accordingly, various operations may be performed without decrypting the encrypted messages.

The categorical data is data expressed as values that may be classified into categories, and is data expressed as values classified in a class to which the data belongs, such as a gender, an age group, and a region, and is also referred to as category data.

Unlike numerical data, for categorical data value, a numerical value corresponding to a class itself is not meaningful, so the categorical data requires a separate encryption method to reflect these features.

In addition, in the case of specific categorical data, for example, descriptive statistics for different numeric columns based on the class are required, such as descriptive statistics for each category. For example, there are average income by age, standard deviation of height by gender, political party approval rating by region, etc.

In order to perform the operation on such descriptive statistics in the homomorphic encrypted message state, many operations are required.

SUMMARY

An object of the present disclosure is to provide an electronic apparatus and method capable of generating homomorphic encrypted message for categorical data to increase operation efficiency during statistical operation of the homomorphic encrypted message.

According to an aspect of the present disclosure, an electronic apparatus includes: a memory configured to store at least one instruction and store a plurality of categorical data whose values are expressed as a plurality of classes for one category; and a processor configured to execute the at least one instruction to generate the plurality of categorical data into one homomorphic encrypted message.

The processor may be configured to generate a categorical column in which homomorphically encrypted data for each of the plurality of categorical data is located in a plurality of slots, generate mask columns corresponding to each of the plurality of classes to correspond to the number of the plurality of classes, and generate the homomorphic encrypted message by combining the categorical column and the plurality of mask columns.

Each of the plurality of mask columns may include a plurality of slots, and each of the plurality of slots in the mask column may have encrypted data indicating whether a class of the corresponding slot in the categorical column is a class corresponding to the mask column.

The processor may be configured to generate plaintext column data using the plurality of categorical data and generate the mask column by homomorphically encrypting the column data.

The plurality of slots in the mask column may include a plurality of data slots corresponding to slots in the categorical column, and one or more additional information slots storing statistical information of the mask column.

The one or more additional information slots may include at least one of information on a first number of categorical data corresponding to the class corresponding to the mask column, information on a second number of categorical data not corresponding to the class corresponding to the mask column, and information on a preset operation processing value for the first number.

The information stored in the additional information slot may be homomorphically encrypted.

The memory may store numerical data corresponding to each of the plurality of categorical data, and the processor may be configured to generate a numeric column by homomorphically encrypting the numerical data, and generate the homomorphic encrypted message by combining the categorical column, the plurality of mask columns, and the numeric column.

When a statistical operation command for the categorical data and the numerical data is input, the processor may be configured to perform a homomorphic operation on a mask column corresponding to the statistical operation command among the plurality of mask columns and the numeric column to generate a statistical result encrypted message corresponding to the statistical operation command.

According to another aspect of the present disclosure, a method for generating a homomorphic encrypted message includes: storing a plurality of categorical data whose values are expressed as a plurality of classes for one category; generating a categorical column in which homomorphically encrypted data for each of the plurality of categorical data is located in a plurality of slots; generating mask columns corresponding to each of the plurality of classes to correspond to the number of the plurality of classes; and generating a homomorphic encrypted message by combining the categorical column and the plurality of mask columns.

The mask column may include the plurality of slots, and each of the plurality of slots in the mask column may have encrypted data indicating whether a class of the corresponding slot in the categorical column is a class corresponding to the mask column.

In the generating of the mask column, plaintext column data may be generated using the plurality of categorical data, and the mask column may be generated by homomorphically encrypting the column data.

The plurality of slots in the mask column may include a plurality of data slots corresponding to slots in the categorical column, and one or more additional information slots storing statistical information of the mask column.

The one or more additional information slots may include at least one of information on a first number of categorical data corresponding to the class corresponding to the mask column, information on a second number of categorical data not corresponding to the class corresponding to the mask column, and information on a preset operation processing value for the first number.

The information stored in the additional information slot may be homomorphically encrypted.

In the storing, numerical data corresponding to each of the plurality of categorical data may be further stored, the method for generating a homomorphic encrypted message may further include generating a numeric column by homomorphically encrypting the numerical data, and in the generating of the homomorphic encrypted message, the homomorphic encrypted message may be generated by combining the categorical column, the plurality of mask columns, and the numeric column.

The method may further include receiving a statistical operation command for the categorical data and the numerical data, and generating a statistical result encrypted message corresponding to the statistical operation command by performing a homomorphic operation on a mask column corresponding to the statistical operation command among the plurality of mask columns and the numeric column.

According to still another aspect of the present disclosure, there is provided a computer-readable recording medium including a program for executing a method for generating a homomorphic encrypted message, in which the method for generating a homomorphic encrypted message includes: storing a plurality of categorical data whose values are expressed as a plurality of classes for one category; generating a categorical column in which homomorphically encrypted data for each of the plurality of categorical data is located in a plurality of slots; generating mask columns corresponding to each of the plurality of classes to correspond to the number of the plurality of classes; and generating a homomorphic encrypted message by combining the categorical column and the plurality of mask columns.

Therefore, the present disclosure is designed to solve the problems described above. In a process of homomorphic encryption of categorical data, a homomorphic encrypted message is generated to have class column information corresponding to each of a plurality of classes for one category, and therefore, in a process of performing a statistical operation on the homomorphic encrypted message, it is possible to easily perform the statistical operation without a separate filtering operation.

DETAILED DESCRIPTION

Figure 1:
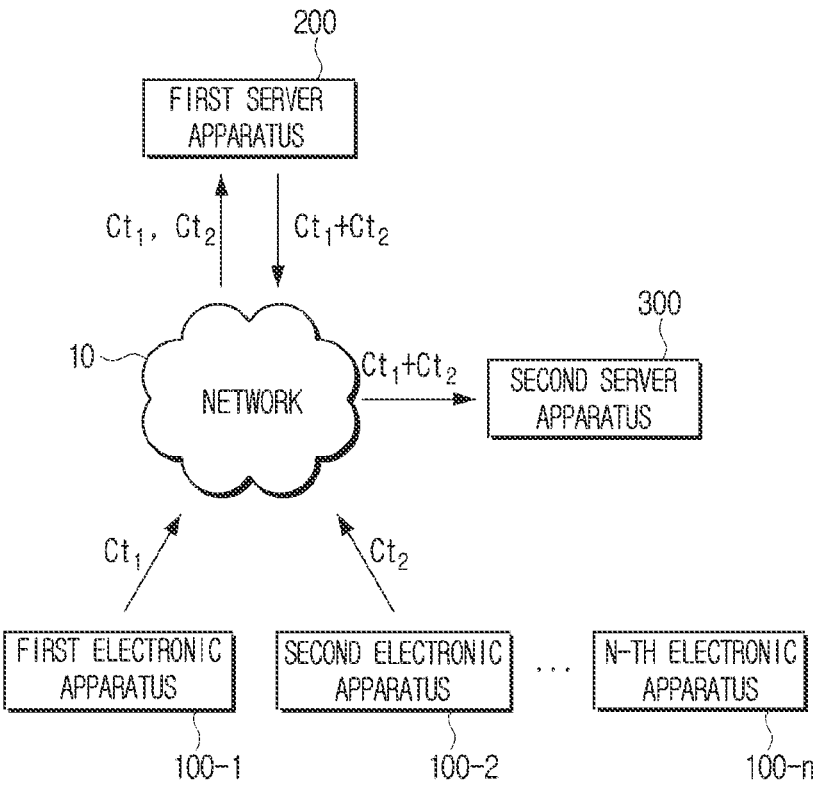
FIG. 1 is a diagram for describing a structure of a network system according to an embodiment of the present disclosure.

Hereinafter, the present disclosure will be described in detail with reference to the accompanying drawings. Encryption/decryption may be applied to an information (data) transmission process performed in the present disclosure, and all expressions describing the information (data) transmission process in the present disclosure and claims should be interpreted as including cases of encryption/decryption even if not separately stated. In the present disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should be defined regardless of the order of the steps. In this specification, "A or B" is defined to mean not only selectively indicating either one of A and B, but also including both A and B. In addition, in the present disclosure, the term "include" has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, "value" is defined as a concept including a vector and a polynomial form as well as a scalar value.

Mathematical operations and calculations of each step of the present disclosure to be described below may be implemented as computer operations by the known coding method and/or coding designed to suit the present disclosure for the corresponding operation and calculation.

Specific equations to be described below are illustratively described among possible alternatives, and the scope of the present disclosure should not be construed as being limited to equations mentioned in the present disclosure.

For convenience of description, in the present disclosure, a notation is defined as follows.

a←D: select element (a) according to distribution (D)

$s_1, s_2 \in R$: Each of $s_1$ and $s_2$ is an element belonging to set R.

mod (q): Modular operation with element q $\lfloor \cdot \rfloor$: Round-off internal value Hereinafter, diverse exemplary embodiments of the present disclosure will be described in detail with reference to the accompanying drawings.

FIG. 1 is a diagram for describing a structure of a network system according to an embodiment of the present disclosure.

Referring to FIG. 1, a network system may include a plurality of electronic apparatuses 100-1 to 100-$n$, a first server apparatus 200, and a second server apparatus 300, each of which may be connected to each other through a network 10.

The network 10 may be implemented in various types of wired and wireless communication networks, broadcasting communication networks, optical communication networks, cloud networks, etc., and each apparatus may also be connected through methods such as Wi-Fi, Bluetooth, Near Field Communication (NFC), etc., without a separate medium.

Although FIG. 1 illustrates a plurality of electronic apparatuses 100-1 to 100-$n$, a plurality of electronic apparatuses are not necessarily used, and one apparatus may be used. For example, the electronic apparatuses 100-1 to 100-$n$ may be implemented as various types of apparatuses such as smart phones, tablets, game players, PCs, laptop PCs, home servers, and kiosks. In addition, the electronic apparatuses 100-1 to 100-$n$ may be implemented in the form of home appliances to which an IoT function is applied.

Users may input various types of information through the electronic apparatuses 100-1 to 100-$n$ they use. The input information may be stored in the electronic apparatuses 100-1 to 100-$n$ themselves, but may also be transmitted to and stored in an external device for storage capacity and security reasons. In FIG. 1, the first server apparatus 200 may serve to store such information, and the second server apparatus 300 may serve to use some or all of the information stored in the first server apparatus 200.

Each electronic apparatuses 100-1 to 100-$n$ may homomorphically encrypt the input information and transmit a homomorphic encrypted message to the first server apparatus 200. In this case, the input information may be categorical data. In addition, each electronic apparatus 100-1 to 100-$n$ may generate the categorical data and numerical data as one homomorphic encrypted message. A method for homomorphically encrypting categorical data will be described in more detail in FIG. 2.

In a process of performing homomorphic encryption, when performing homomorphic encryption on categorical data, each electronic apparatus 100-1 to 100-$n$ may generate mask columns corresponding to each of the plurality of classes of categorical data and generate a homomorphic encrypted message including the mask columns. Here, the mask column has encrypted data indicating whether the class of the corresponding slot in the categorical column of the plurality of slots in the mask column is the class corresponding to the mask column.

Each of the electronic apparatuses 100-1 to 100-$n$ may include encryption noise, i.e., an error, generated in the process of performing homomorphic encryption in an encrypted message. For example, the homomorphic encrypted messages generated by each of the electronic apparatuses 100-1 to 100-$n$ may be generated in a form in which a result value including a message and an error value is restored when decrypted later using a secret key.

For example, when the homomorphic encrypted messages generated by the electronic apparatuses 100-1 to 100-$n$ are decrypted using a secret key, the homomorphic encrypted messages may be generated in a form that satisfies the following natures.

$$Dec(ct, sk) = <ct, sk> = M + e(\bmod q) \qquad \text{[Equation 1]}$$

Here, $<,>$ denotes a usual inner product, ct denotes an encrypted message, sk denotes a secret key, M denotes a plaintext message, e denotes an encryption error value, and mod q denotes a modulus of an encrypted message. q should be selected to be greater larger than a result value M obtained by multiplying a scaling factor $\Delta$ by a message. When an absolute value of the error value e is sufficiently small compared to M, a decryption value M+e of the encrypted message is a value that may replace the original message with the same precision in significant figure operation. Among the decrypted data, an error may be arranged on the least significant bit (LSB) side, and M may be arranged on the next least significant bit side.

When a size of the message is too small or too large, the size may be adjusted using a scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the operation is made, that is, a size of an effective area may also be adjusted.

According to the embodiment, a modulus q of the encrypted message may be set and used in various forms. For example, the modulus of the encrypted message may be set in the form of an exponential power $q=\Delta^L$ of the scaling factor $\Delta$. When $\Delta$ is 2, $\Delta$ may be set to a value such as $q=2^{10}$.

As another example, an encrypted message modulus may be set to a value multiplied by a plurality of different scaling factors. Each factor may be set to a value within a similar range, that is, a value of similar size. For example, $q=q_1 q_2 q_3, \ldots, qx$, and $q_1 q_2 q_3, \ldots, q_x$ each have a size similar to the scaling factor $\Delta$ and may be set to values with a coprime relationship.

When the scaling factor is set in this way, the entire operation may be performed by being separated into a plurality of modulus operations according to Chinese remainder theorem (CRT), thereby reducing the operation burden.

In addition, by using factors of similar sizes, when rounding is performed in the step described later, substantially the same result as the result value in the previous example may be obtained.

The first server apparatus 200 may store the received homomorphic encrypted message in an encrypted message state without decrypting received homomorphic encrypted message.

The second server apparatus 300 may request a specific processing result for the homomorphic encrypted message from the first server apparatus 200. The first server apparatus 200 may perform specific operation according to the request of the second server apparatus 300 and then transmit the result to the second server apparatus 300. Here, the specific operation may be general operations such as addition and homomorphic product of the plurality of homomorphic encrypted messages, as well as statistical operations, for example, operations such as mean, frequency distribution, linear regression, and covariance. In addition, in addition to statistical operations for one category, operations such as descriptive statistics for each category may also be performed.

In this case, the second server apparatus 300 may perform a combining operation for the plurality of homomorphic encrypted messages.

For example, when encrypted messages $ct_1$ and $ct_2$ transmitted by the two electronic apparatuses 100-1 and 100-2 are stored in the first server apparatus 200, the second server apparatus 300 may request, from the first server apparatus 200, a value obtained by summing information provided from the two electronic apparatuses 100-1 and 100-2. The first server apparatus 200 may perform an operation for summing the two encrypted messages according to the request, and then transmit the result value $ct_1+ct_2$ to the second server apparatus 300.

Due to the nature of the homomorphic encrypted message, the first server apparatus 200 may perform the operation without the decryption, and the result value may also be in the form of the encrypted message. In this case, the first server apparatus 200 may perform bootstrapping on the operation result.

The first server apparatus 200 may transmit the operation result encrypted message to the second server apparatus 300. The second server apparatus 300 may decrypt the received operation result encrypted message and acquire operation result values of data included in each homomorphic encrypted message. The first server apparatus 200 may perform the operation several times according to a user request.

Meanwhile, FIG. 1 illustrates a case where the first electronic apparatus and the second electronic apparatus perform the encryption and the second server apparatus performs the decryption, but is not limited thereto.

Figure 2:
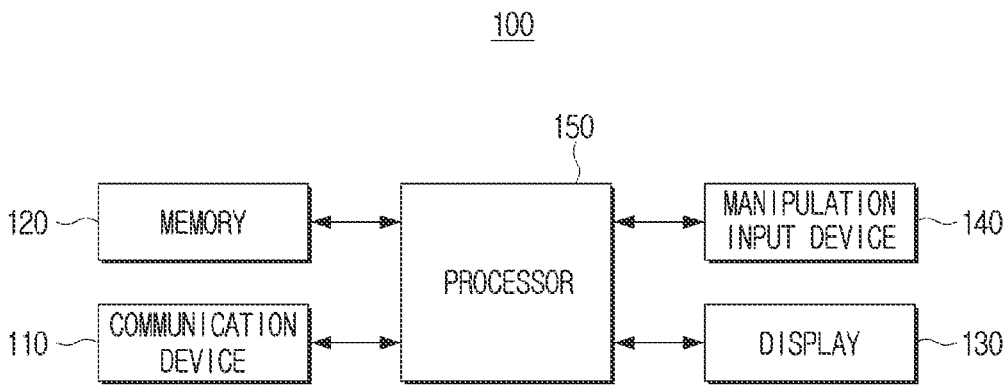
FIG. 2 is a block diagram illustrating a configuration of an electronic apparatus according to an embodiment of the present disclosure.

FIG. 2 is a block diagram illustrating a configuration of the electronic apparatus according to the embodiment of the disclosure.

Referring to FIG. 2, the electronic apparatus 100 may include the memory 110, the processor 120, a communication device 130, a display 140, and a manipulation input device 150. The electronic apparatus may be various devices such as a personal computer (PC), a laptop computer, a smart phone, a tablet, and a server.

At least one instruction regarding the electronic apparatus 100 may be stored in the memory 110. For example, the memory 110 may store various programs (or software) for operating the electronic apparatus 100 according to various embodiments of the present disclosure.

The memory 110 may be implemented in various forms such as RAM, ROM, buffer, cache, flash memory, HDD, external memory, and memory card, but is not limited to any one.

The memory 110 may store messages to be encrypted. Here, the message may be various types of credit information, personal information, and the like cited by a user, and may also be information related to location information used in the electronic apparatus 100 and a use history such as Internet usage time information. In addition, these messages may be not only data expressed in numerical form, but also categorical data expressed as a plurality of classes for one category. For example, when the above-described category is gender, values such as 1 for male and 2 for female may be classes. In the above, gender is described as an example of a category, but in implementation, various categories such as region, religion, affiliation, etc., may be used.

In addition, the memory 110 may store a public key, and when the electronic apparatus 100 directly generates the public key, the memory 110 may store not only a secret key, but also various parameters necessary for generating the public key and the secret key.

Also, the memory 110 may store the homomorphic encrypted message generated in the process described below. Also, the memory 110 may store the homomorphic encrypted message transmitted from the external device. Also, the memory 110 may store the operation result encrypted message that is the result of the operation process described later.

The communication device 130 is formed to connect the electronic apparatus 100 to an external device (not illustrated), and may be connected to the external device through a local area network (LAN) and the Internet network or be connected to the external device through a USB port or a wireless communication (for example, wireless fidelity (Wi-Fi), 802.11a/b/g/n, near field communication (NFC), or Bluetooth) port. Such a communication device 130 may also be referred to as a transceiver.

The communication device 130 may receive the public key from the external device and may transmit the public key generated by the electronic apparatus 100 itself to an external device.

Also, the communication device 130 may receive a message from the external device and transmit the generated homomorphic encrypted message or the operation result to the external device.

Also, the communication device 130 may receive various parameters required for generating an encrypted message from an external device. Meanwhile, upon implementation, various parameters may be directly received from a user through the manipulation input device 150 to be described later.

In addition, the communication device 130 may receive a request for an operation of the homomorphic encrypted message from an external device and transmit the calculated result to the external device. Here, the requested operation may be an operation such as addition, subtraction, or multiplication (for example, a modular multiplication operation), or may be a statistical operation. Here, the modular multiplication operation means a modular operation with q elements.

The display 140 displays a user interface window for selecting a function supported by the electronic apparatus 100. For example, the display 140 may display a user interface window for selecting various functions provided by the electronic apparatus 100. The display 140 may be a monitor such as a liquid crystal display (LCD) and organic light emitting diodes (OLED), and may be implemented as a touch screen capable of simultaneously performing the functions of the manipulation input device 150 to be described later.

The display 140 may display a message requesting input of parameters necessary for generating a secret key and a public key. Also, the display 140 may display a message in which an encryption target selects a message. Meanwhile, in implementation, the encryption target may be directly selected by a user or may be automatically selected. That is, personal information or the like that requires encryption may be automatically set even if a user does not directly select a message.

The manipulation input device 150 may select a function of the electronic apparatus 100 and receive a control command for the function from the user. For example, the manipulation input device 150 may receive parameters necessary for generating a secret key and a public key from the user. Also, the manipulation input device 150 may receive a message to be encrypted from a user.

The processor 120 may control the overall operation of the electronic apparatus 100. For example, the processor 120 may generally control the operation of the electronic apparatus 100 by executing at least one instruction stored in the memory 110. The processor 120 may be composed of a single device such as a central processing unit (CPU) and an application-specific integrated circuit (ASIC), or may be composed of a plurality of devices such as a CPU and a graphics processing unit (GPU).

When the message to be transmitted is input, the processor 120 may store the message in the memory 110. The processor 120 may use various setting values and programs stored in the memory 110 to homomorphically encrypt the message. In this case, the public key may be used.

The processor 120 may generate and use a public key required to perform encryption by itself, or may receive and use the public key from an external device. For example, the second server device 300 that performs the decryption may distribute a public key to other devices.

When generating a key by itself, the processor 120 may generate a public key using a ring-LWE technique. For example, the processor 120 may first set various parameters and rings and store the parameters and rings in the memory 110. Examples of the parameters may include a length of bits of a plaintext message, a size of public and secret keys, and the like. The ring may be expressed as Equation 2 below:

$$R = \frac{Z_q[X]}{f(x)} \qquad \text{[Equation 2]}$$

Here, R denotes a ring, Zq denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient Zq. For example, when n is Φ(N), it may mean an N-th cyclotomic polynomial. f(x) denotes ideal of Zq[x] generated by the f(x). The Euler totient function Φ(N) means the number of natural numbers that is coprime to N and smaller than N. When $\Phi_N(x)$ is defined as an N-th cyclotomic polynomial, the ring may also be represented by Equation 3 as follows. Here, N may be 217.

$$R = \frac{Z_q[X]}{\Phi_N(x)} \qquad \text{[Equation 3]}$$

The secret key sk may be represented as follows.

Meanwhile, the ring of Equation 3 described above has a complex number in the plaintext space. Meanwhile, in order to improve the operation speed of the homomorphic encrypted message, only a set in which the plaintext space is a real number in the above-described set of rings may be used.

When such a ring is established, the processor 120 may calculate the secret key sk from the ring.

$$sk \leftarrow (1, s(x)), s(x) \in R \qquad \text{[Equation 4]}$$

Here, s(x) means a polynomial generated randomly with small coefficients.

The processor 120 may calculate a first random polynomial a (x) from the ring. The first random polynomial may be expressed as follows.

$$a(x) \leftarrow R \qquad \text{[Equation 5]}$$

In addition, the processor 120 may calculate an error. For example, the processor 120 may extract an error from a discrete Gaussian distribution or a distribution statistically close to the discrete Gaussian distribution. This error may be expressed as follows.

$$e(x) \leftarrow D_{\alpha q}^n \qquad \text{[Equation 6]}$$

When the error is calculated, the processor 120 may calculate a second random polynomial by performing a modular operation on the error in the first random polynomial and the secret key. The second random polynomial may be expressed as follows.

$$b(x) = -a(x)s(x) + e(x)(\bmod q) \qquad \text{[Equation 7]}$$

Finally, a public key pk is set as follows in a form including the first random polynomial and the second random polynomial.

$$pk = (b(x), a(x)) \qquad \text{[Equation 8]}$$

Since the above-described key generation method is only an example, it is not necessarily limited thereto, and it goes without saying that the public key and the secret key may be generated by other methods.

Meanwhile, when the public key is generated, the processor 120 may control the communication device 130 to transmit the public key to other devices.

The processor 120 may generate a homomorphic encrypted message for a message. For example, the processor 120 may generate the homomorphic encrypted message by applying the previously generated public key to the message.

The message to be decrypted may be received from an external source, or may be input from an input device directly provided on or connected to the electronic apparatus 100. For example, when the electronic apparatus 100 includes a touch screen or key pad, the processor 120 may store data input by the user through the touch screen or key pad in the memory 110 and then encrypt the data. When the generated homomorphic encrypted message is decrypted, it may be restored to a result value obtained by adding an error to a value reflecting the scaling factor in the message. The scaling factor may use a pre-input and set value as it is.

Alternatively, the processor 120 may perform encryption using the public key directly after multiplying the message and the scaling factor. In this case, the error calculated during the encryption process may be added to the result value obtained by multiplying the message by the scaling factor.

In addition, the processor 120 may generate the length of the encrypted message to correspond to the size of the scaling factor.

When the homomorphic encrypted message is generated, the processor 120 may control the communication device 130 to store the homomorphic encrypted message in the memory 110 or transmit the homomorphic encrypted message to another device according to a user request or a predetermined default command.

Meanwhile, according to an embodiment of the present disclosure, packing may be performed. When the packing is used in homomorphic encryption, it becomes possible to encrypt a plurality of messages into one encrypted message. In this case, when the electronic apparatus 100 performs an operation between each encrypted message, since operations for multiple messages are processed in parallel, the operation burden is greatly reduced.

For example, when a message is composed of a plurality of message vectors, the processor 120 may transform a plurality of message vectors into a polynomial in a form that the plurality of message vectors may be encrypted in parallel, multiply the polynomial by a scaling factor, and perform the homomorphic encryption using a public key. Accordingly, the processor 120 may generate an encrypted message in which a plurality of message vectors are packed.

Meanwhile, when the electronic apparatus 100 generates the categorical data as the homomorphic encrypted message, the electronic apparatus 100 may generate the homomorphically encrypted data for each of the plurality of categorical data with the above-described public key, and generate a column-shaped data set by arranging the generated encrypted data in a plurality of slots. Meanwhile, during implementation, the plurality of categorical data may be placed in the plurality of slots, and the plurality of categorical data stored in the plurality of slots may be homomorphically encrypted in parallel.

The electronic apparatus 100 may generate the mask columns corresponding to each of the plurality of classes of the categorical data. Here, the mask column is data having encrypted data indicating whether each of the plurality of slots in the categorical column in which the above-described categorical data is encrypted is a specific class. For this operation, the electronic apparatus 100 may use the plurality of categorical data, that is, use plaintext data to generate column data corresponding to each class value, and homomorphically encrypt the corresponding column data to generate the mask column. The specific mask column generation operation will be described later with reference to FIG. 4.

Further, when the homomorphic encrypted message needs to be decrypted, the processor 120 may apply a secret key to the homomorphic encrypted message to generate a polynomial-type decrypted message, and decode the polynomial-type decrypted message to generate a message. In this case, the generated message may include an error as mentioned in Equation 1 described above.

The processor 120 may perform the operation on the encrypted message. For example, the processor 120 may perform various statistical operations such as average and frequency distribution for a plurality of pieces of information as well as operations such as addition, subtraction, or multiplication while maintaining the encrypted state for the homomorphic encrypted message. In this case, the statistical operation may not only be an operation on one item, but also a statistical operation (i.e., descriptive statistics) using a plurality of items may be performed. The specific statistical operation method will be described later with reference to FIGS. 5 and 6.

Meanwhile, when the operation is completed, the electronic apparatus 100 may detect data in an effective area from the operation result data. For example, the electronic apparatus 100 may detect data in the effective area by performing rounding processing on the operation result data.

Here, the rounding processing means rounding-off a message in an encrypted state, and may also be referred to as rescaling. Specifically, the electronic apparatus 100 may remove a noise region by multiplying each component of the encrypted message by $\Delta^{-1}$ which is the reciprocal of the scaling factor, and rounding-off each component of the encrypted message. The noise area may be determined to correspond to the size of the scaling factor. As a result, it is possible to detect a message in the effective area from which the noise area is excluded. Since it proceeds in the encrypted state, an additional error occurs, but the size is small enough to be ignored.

The above-described rounding process may use the modular multiplication operation as described above.

In addition, the electronic apparatus 100 may expand a plaintext space of the encrypted message as a result of the operation when the proportion of the approximate message in the encrypted message as a result of the operation exceeds a threshold. For example, when q is less than M in Equation 1 described above, since M+e (mod q) has a different value from M+e, the decryption becomes impossible. Therefore, the q value should always be kept greater than M. However, as the operation progresses, the q value gradually decreases. The expansion of the plaintext space means changing the encrypted message ct into an encrypted message having a larger modulus. The operation of expanding the plaintext space may also be referred to as rebooting. As the rebooting is performed, the encrypted message can be operated again.

As described above, the electronic apparatus 100 according to the present disclosure may efficiently perform not only the operation on the homomorphic encrypted messages, but also the complex statistical operation. In addition, the electronic apparatus 100 is capable of managing the homomorphic encrypted messages provided by a plurality of devices into one DB.

Hereinafter, the specific statistical operation for the homomorphic encrypted message will be described.

First, for the efficient statistical operation of the homomorphic encrypted message, in this disclosure, the homomorphic encrypted message is generated to have the following data structure.

This is about how to store plaintext table data, that is, a plurality of recorded data composed of several features, in a homomorphic encryption that provides a single instruction multiple data (SIMD) function. For this purpose, data for each feature may be collected and stored in the encrypted message. In other words, one encrypted message may store only data belonging to one feature. Here, this means that one encrypted message does not include only one piece of information, but that one encrypted message may store a plurality of variable values for one feature.

The homomorphic encrypted message may include the plurality of slots, and the plurality of pieces of information may be stored in each slot. Therefore, using this point, values for one feature (i.e., information on the same column in the table) may be stored in each of the plurality of slots.

Specifically, the table data may be stored and managed in the following format. For example, when the size of the plaintext table is n, m (where n is the length of the data row, m is the length of the data column (=number of features)), and the number of data that a fully homomorphic encrypted message may contain is M(=N/2), the encryption table including the encrypted data may include the following contents.

1. Encrypted message $c_{0,0}$, $c_{0,1}$, . . . , $c_{0,\lceil n/M-1\rceil}$, $c_{1,0}$, . . . , $c_{m-1,0}$, $c_{m-1,1}$, . . . , $c_{m-1,\lceil n/M-1\rceil}$ (here, the encrypted message $c_{ij}$ is a (j−1)th encrypted message including an i+1th feature, and the number of encrypted messages is $\lceil n/A \rceil$ for each feature 2. Total number of features m, data rows n 3. Other additional metadata (e.g., names of each feature, the number of data included in one encrypted message (also called 1 block), table name)

In this way, the homomorphic encrypted message stores the plurality of data into each of the plurality of slots, which is advantageous for parallel processing.

Figure 3:
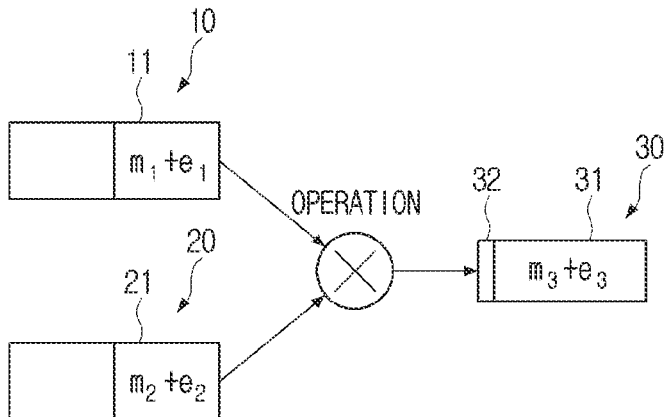
FIG. 3 is a diagram for describing an operation for a homomorphic encrypted message.

FIG. 3 is a diagram for describing an operation for a homomorphic encrypted message.

FIG. 3 is a diagram for describing the operation for the homomorphic encrypted message. Specifically, FIG. 3 illustrates operations for two homomorphic encrypted messages 10 and 20.

Each homomorphic encrypted message 10 and 20 may include approximate message areas 11 and 21, respectively. The approximate message areas 11 and 21 include messages and errors m1+e1 and m2+e2 together.

For example, when two homomorphic encrypted messages encrypt numerical data, the homomorphic operation result ($Enc(m_3)=Enc(m_1)+Enc(m_2)$) of the two homomorphic encrypted messages is the same as that of the homomorphic encryption of the operation result ($Enc(m_1)+m_2$)) on the plain text.

The following describes the operation method for categorical data, not general numerical data.

As an example, it is assumed that region and salary information for multiple people is statistically analyzed. Since the annual salary here is expressed as a numerical value, the value may be homomorphically encrypted as it is. Meanwhile, categories such as region are categorical data described above, and may be quantified into specific values (classes) corresponding to the region of residence, such as Seoul 1, Busan 2, etc., depending on the region of residence (i.e., class).

Accordingly, when the above-described region and salary information for multiple people is homomorphically encrypted, the homomorphic encrypted message may have a numeric column in which a plurality of salaries are homomorphically encrypted and a categorical column in which the region information is homomorphically encrypted. In this case, each numeric column and regional column may have the same number of slots or more slots corresponding to multiple people, and each slot of two columns has information on the same person.

In order to perform the statistical operation of the salary information of people living in Seoul using this homomorphic encrypted message, it is necessary to first filter people living in Seoul among a plurality of slots and calculate the average of the annual salary information of the filtered people.

However, since the above-described information is homomorphically encrypted, filtering in the homomorphic encrypted message is performed in a relatively high-resource manner where non-polynomial operations are performed. In addition, since the method for using categorical data is generally based on filtering, whenever descriptive statistics are performed, performing the above-described filtering on the above-described homomorphic encrypted message state increases the resource burden.

That is, generally, since the information such as whether or not the categorical data corresponds to a specific class of the corresponding category is often used, in the present disclosure, the categorical column (or empty mask) indicating whether a plurality of categorical data belongs to the corresponding class is generated in advance for each class and is generated as one homomorphic encrypted message with a categorical column corresponding to the above-described categorical data.

As described above, since the homomorphic encrypted message generated according to the present disclosure includes the plurality of mask columns corresponding to each class value, in the statistical operation process that requires filtering of a specific category, it is possible to perform a faster statistical operation using one of the plurality of stored mask columns without the need to perform the statistical operation (i.e. comparison operation) on the encrypted categorical data. As such, the method of generating a homomorphic encrypted message according to the present disclosure will be described in more detail below with reference to FIG. 4.

Figure 4:
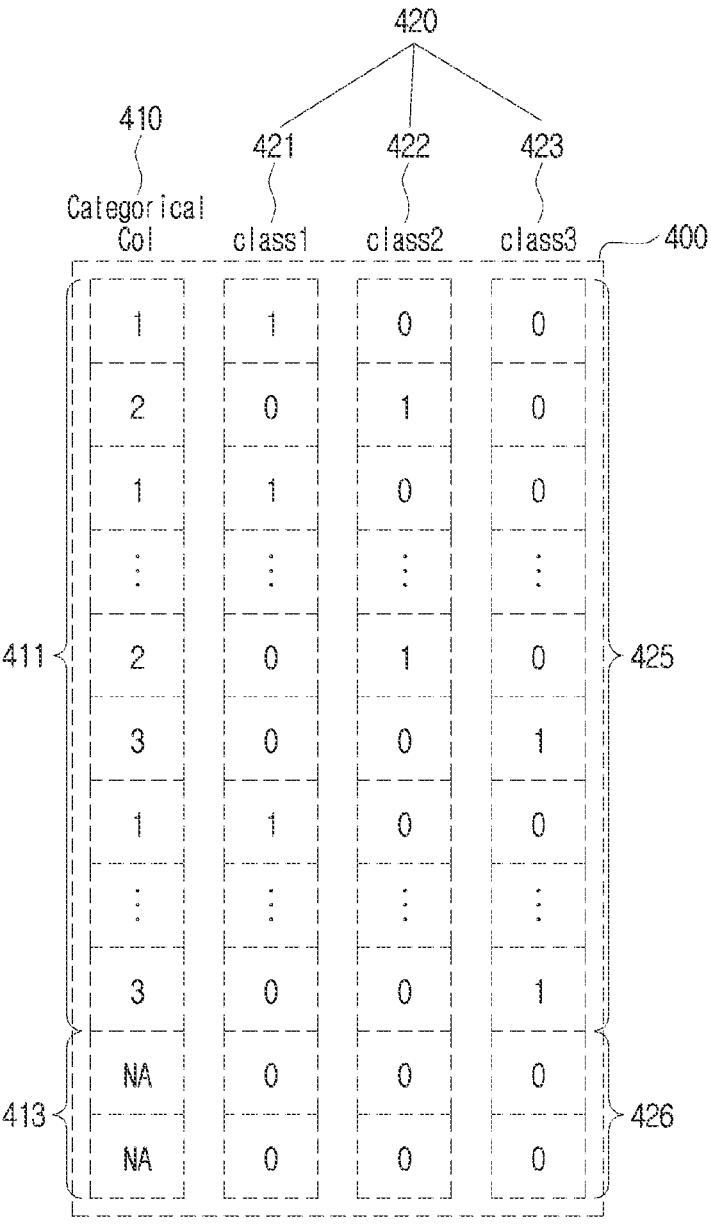
FIG. 4 is a diagram illustrating an example of the homomorphic encrypted message generated according to the embodiment of the present disclosure.

FIG. 4 is a diagram illustrating an example of the homomorphic encrypted message generated according to the embodiment of the present disclosure.

Referring to FIG. 4, the homomorphic encrypted message may include the plurality of columns. In the illustrated example, to facilitate description, data is expressed as a plaintext data value, but in an actual homomorphic encrypted message, each value may have a homomorphic encrypted value.

The homomorphic encrypted message has a categorical column 410 and a plurality of mask columns 420.

First, the categorical column includes a plurality of slots 411, and each slot has a class value of one categorical data. Meanwhile, in the illustrated example, a null slot 413 is additionally included in the categorical column. This null slot 413 is a slot added to match a slot length of the mask column, which will be described later. Such null slots may be filled with a value that is 0 in the plaintext state.

Meanwhile, looking at the values in the categorical column illustrated, it can be seen that the categorical column has values of 1, 2, and 3. In the example illustrated, a case where three classes exist for the corresponding category is shown. Accordingly, the plurality of mask columns 420 may be composed of three columns 421, 422, and 423. Meanwhile, in implementation, when the specific category is composed of two classes, the plurality of mask columns may be two, and when the specific category is composed of four or more classes, the plurality of mask columns may correspond to the number of classes.

The first mask column 421 includes a plurality of slots, and each slot has information indicating whether the class of the slot in the corresponding categorical column is a first class. For example, when the class of the specific slot in the categorical column is 1, the categorical column may have a value of 1, and when the class of the specific slot in the categorical column is not 1, it may have a value of 0.

In the example illustrated, it is shown as having a value of 1 or 0, but in the case of the homomorphic encryption, the categorical column may be expressed as values different from figures shown.

The second mask column 422 includes a plurality of slots, and each slot has information indicating whether the class of the slot in the corresponding categorical column is a second class. For example, when the class of the specific slot in the categorical column is 2, the categorical column may have a value of 1, and when the class of the specific slot in the categorical column is not 2, the categorical column may have a value of 0.

The third mask column 423 includes a plurality of slots, and each slot has information indicating whether the class of the slot in the corresponding categorical column is a third class. For example, when the class of the specific slot in the categorical column is 3, the categorical column may have a value of 1, and when the class of the specific slot in the categorical column is not 3, it may have a value of 0.

Each mask column 420 may include an additional information slot 426. These additional information slots may be used to store frequently used information in the statistical operation process.

For example, there may be the information on the first number of categorical data corresponding to the class corresponding to the mask column, the information on the second number of categorical data not corresponding to the class corresponding to the mask column, the information on the preset operation processing value for the first number, etc. Here, the preset operation processing value may be Equation 9 or 10 below.

$$\frac{1}{\sqrt{n_1 - 1}}$$ [Equation 9]

Here, n1 denotes the number of values of 1 in the mask column or the number of data having the class corresponding to the corresponding mask column.

$$\frac{1}{\sqrt{n_1}}$$ [Equation 10]

Here, n1 denotes the number of values of 1 in the mask column or the number of data having the class corresponding to the corresponding mask column.

The preset operation processing value is a value that may be used for operations such as sample standard deviation. In this way, since various values used in the statistical operation are calculated in advance from the plaintext state and stored in each slot in the homomorphic encrypted state, in the statistical operation process for the homomorphic encrypted message, the encrypted data in the corresponding slot may be used directly without separate operations, so it is possible to shorten the time in the statistical operation process.

Meanwhile, in the illustrated example, two additional information slots 426 are shown and described, but in implementation, only one slot or three or more slots may be used. In addition, depending on the implementation type, the additional information slot 426 may not be used. Meanwhile, when there are three classes in a specific category, but one class is not used at all in the actual data, for example, when there are classes of 1, 2, and 3, but the actual categorical data only has a value of 1 or 2, all of the plurality of data slots in the mask column corresponding to the third class may have homomorphically encrypted data corresponding to a value of 0, and the additional information slot may have the homomorphically encrypted data corresponding to a value of 1.

Meanwhile, in the illustrated example, the data set illustrated in FIG. 4 is described as the homomorphic encrypted message, but it can also be referred to as a data structure (or form) just before the homomorphic encryption. That is, when there are the plurality of categorical data, the electronic apparatus 100 may create the data form as illustrated in FIG. 4 and may homomorphically encrypt the corresponding data form to generate the homomorphic encrypted message.

Figure 5:
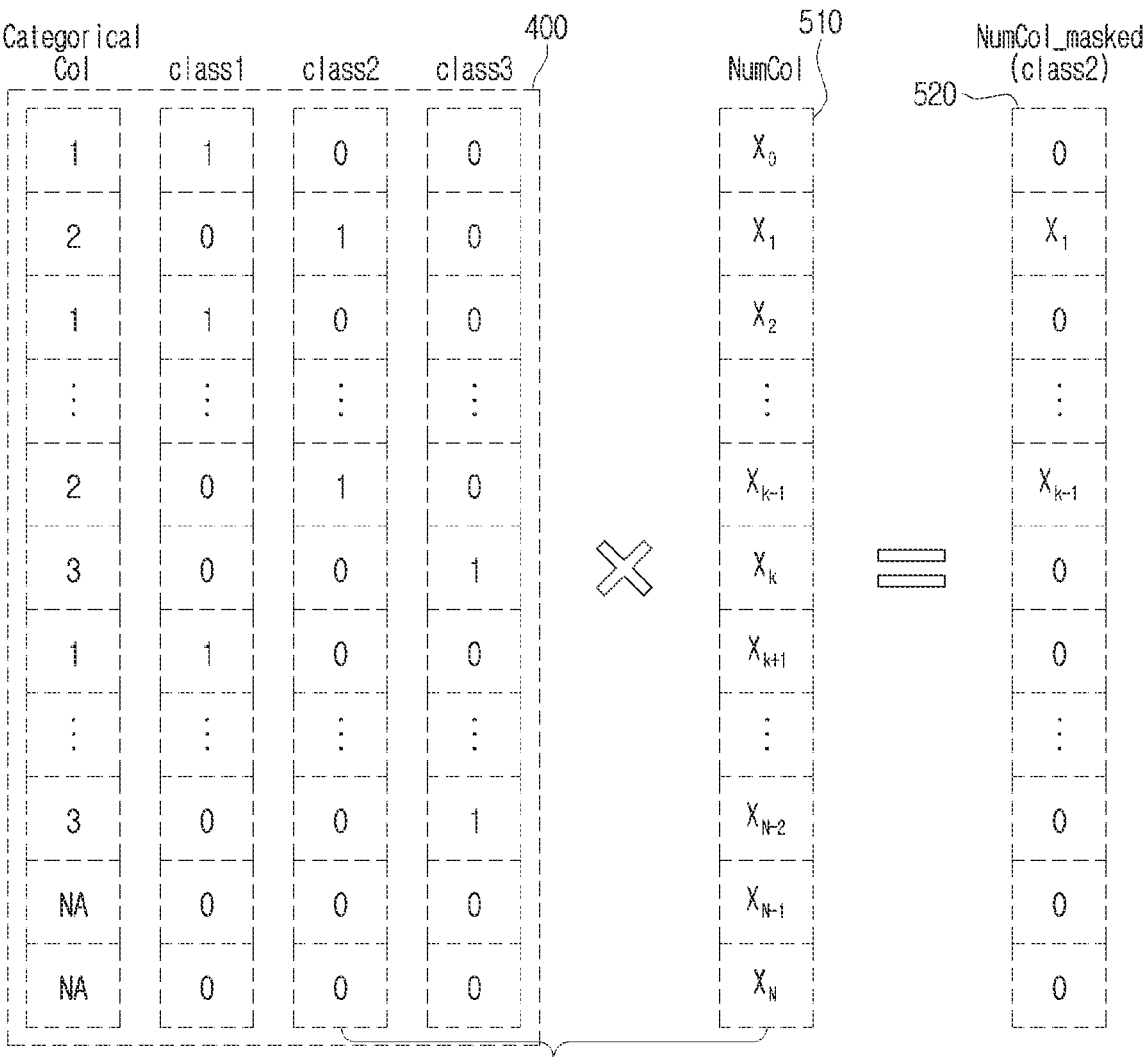
FIG. 5 is a diagram for describing an operation of a statistical operation according to an embodiment of the present disclosure.

FIG. 5 is a diagram for describing an operation of a statistical operation according to an embodiment of the present disclosure.

Referring to FIG. 5, there are a first homomorphic encrypted message 400 and a second homomorphic encrypted message 510. Here, the first homomorphic encrypted message is the homomorphic encrypted message for categorical data as described in FIG. 4, and the second homomorphic encrypted message 510 is the homomorphic encrypted message for numerical data. Meanwhile, hereinafter, for ease of description, it is shown and described as operations for two homomorphic encrypted messages, but in implementation, the second homomorphic encrypted message 510 may be included in the first homomorphic encrypted message. In other words, the homomorphic encrypted message may encrypt not only the categorical data but also the numerical data.

It is assumed that the first homomorphic encrypted message described above is the categorical data divided into three classes, and the second homomorphic encrypted message is the numerical data expressed as a figure such as age. It is assumed that the statistical operation to be performed is an average age of people belonging to a specific region.

In this case, the electronic apparatus 100 may perform homomorphic multiplication on the mask column 422 corresponding to a specific region and the second homomorphic encrypted message. Here, the homomorphic multiplication is an operation that performs multiplication of each data on a slot-by-slot basis in the state of a homomorphic encrypted message.

In this way, when the homomorphic multiplication is performed on the categorical column corresponding to the specific region and the second homomorphic encrypted message, the operation result 520 in which only the ages of people belonging to the specific region remain, and the ages of people belonging to the remaining regions are 0 may be obtained.

When such an operation result 520 is obtained, addition is performed between the slots within the operation result 520, and when the addition result is divided using the information (number information belonging to a specific class) stored in the additional information, it is possible to calculate the average age of people belonging to the specific region.

Figure 6:
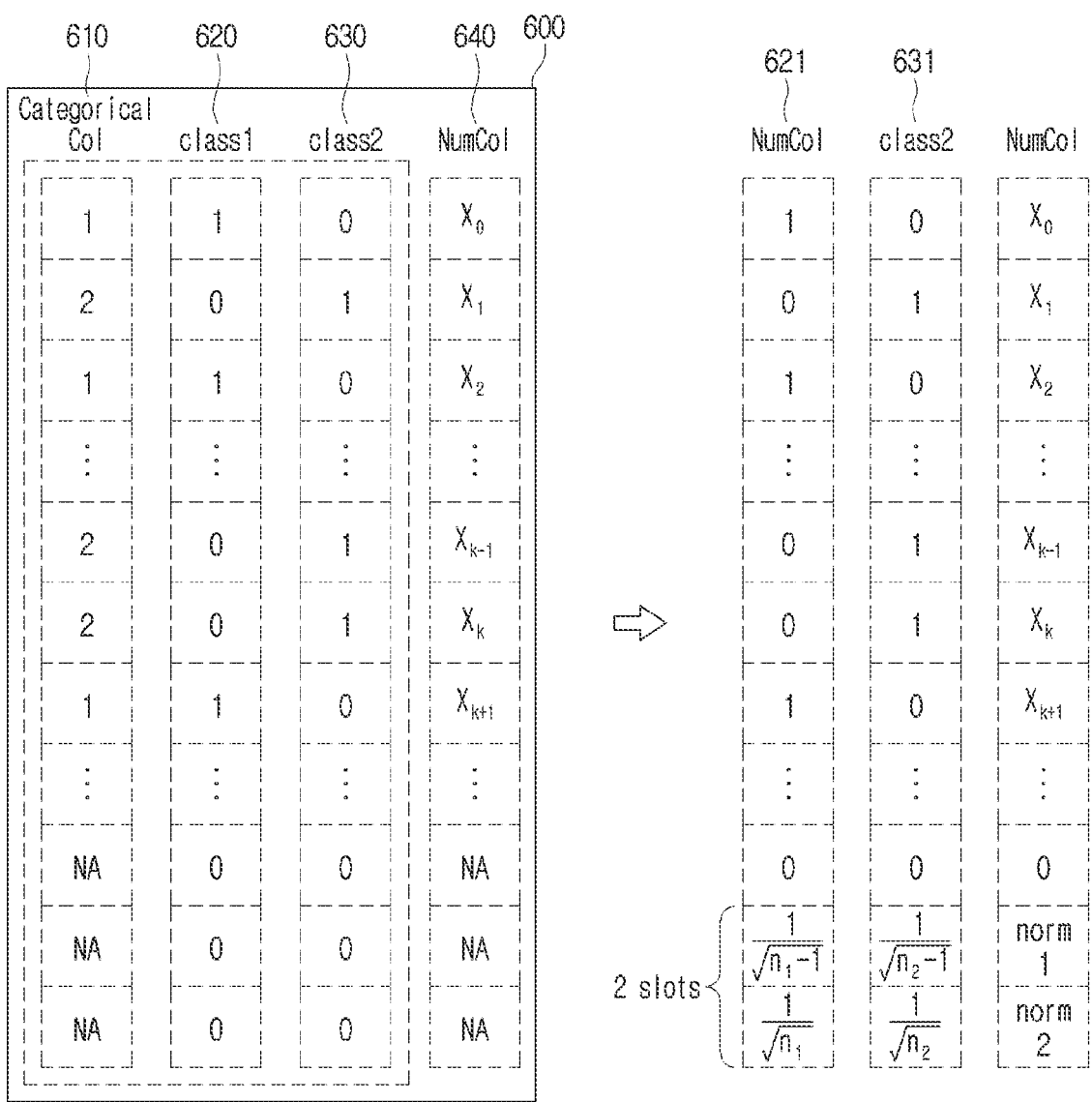
FIG. 6 is a diagram illustrating an example of a homomorphic encrypted message generated according to other embodiments of the present disclosure.

FIG. 6 is a diagram illustrating an example of the homomorphic encrypted message generated according to the embodiment of the present disclosure.

Referring to FIG. 6, a homomorphic encrypted message 600 may include the plurality of columns. Specifically, the homomorphic encrypted message 600 includes a categorical column 610, a first mask column 620, a second mask column 630, and a numeric column 640. Such homomorphic encrypted message may encrypt and store not only the categorical data but also the numerical data.

The categorical column 610 has a plurality of slots, and each slot has data in which a specific class value is homomorphically encrypted. In the illustrated example, the data included in the corresponding categorical column has a value of 1 or 2, that is, the corresponding category has only two classes, so the homomorphic encrypted message 600 includes only two mask columns 620 and 630.

The first mask column 620 includes a plurality of data slots and a plurality of additional information slots. Each of the plurality of data slots has information indicating whether the class of the slot of the corresponding categorical column is the first class. For example, when the class of the specific slot in the categorical column is 1, the categorical column may have a value of 1, and when the class of the specific slot in the categorical column is not 1, it may have a value of 0. The additional information slot may have the preset operation values for the values of the corresponding class, as illustrated at 621.

The second mask column 630 includes a plurality of data slots and a plurality of additional information slots. Each of the plurality of data slots has information indicating whether the class of the slot of the corresponding categorical column is the second class. For example, when the class of the specific slot in the categorical column is 2, the categorical column may have a value of 1, and when the class of the specific slot in the categorical column is not 2, the categorical column may have a value of 0.

The numeric column 640 includes a plurality of slots, and numerical values are homomorphically encrypted and stored in each of the plurality of slots. As illustrated, the numeric column 640 may also include an additional information slot storing additional information for the corresponding numeric column.

Figure 7:
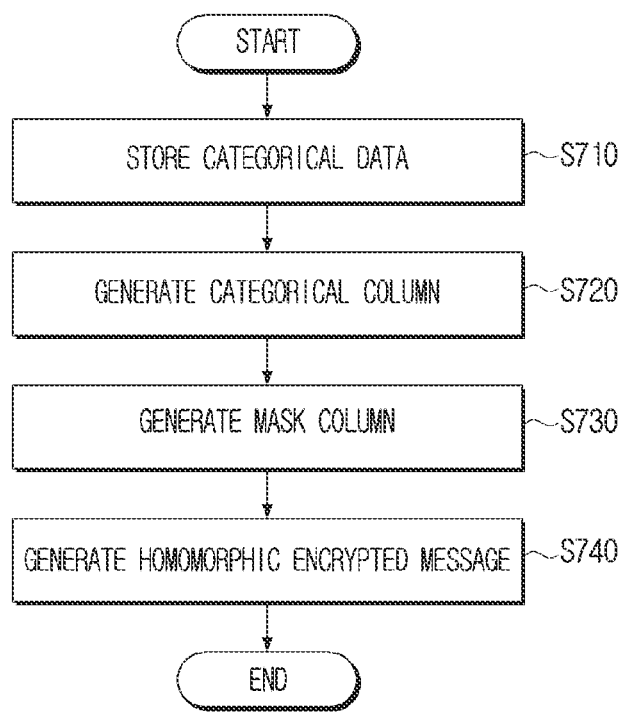
FIG. 7 is a flowchart for describing a method for generating a homomorphic encrypted message according to an embodiment of the present disclosure.

FIG. 7 is a flowchart for describing a method for generating a homomorphic encrypted message according to an embodiment of the present disclosure.

First, the plurality of categorical data whose values are expressed as a plurality of classes for one category are stored (S710). In this case, the electronic apparatus may further store the numerical data along with the plurality of categorical data described above. Specifically, the statistical data (or data) having categorical values and numerical values for each of a plurality of factors may be stored. Meanwhile, in the present disclosure, it is described that the plurality of categorical data (or numerical data) are stored in advance, but in implementation, the process described later may be immediately performed by receiving categorical data from an external device.

The categorical column in which the homomorphically encrypted data for each of the plurality of categorical data is located in the plurality of slots is generated (S720). Here, the categorical column includes the plurality of slots, and each slot may have the homomorphically encrypted value for the categorical data. Accordingly, the electronic apparatus may place the plurality of categorical data in the form of the plurality of slots and homomorphically encrypt the data stored in the plurality of slots using the public key. Alternatively, the electronic apparatus may homomorphically encrypt each of the plurality of categorical data using the public key and store the homomorphically encrypted data in units of slots to generate the categorical column.

The mask columns corresponding to each of the plurality of classes are generated corresponding to the number of the plurality of classes (S730). Specifically, the plaintext column data may be generated the plurality of categorical data, and the mask column may be generated by homomorphically encrypting the column data.

For example, when there are two values, such as the first class and the second class, for the specific category, when the data in each slot is the first class to correspond to the slot order (or location) of the mask column, first mask data, which has a value of 1, may be generated, and otherwise, the first mask data, which has a value of 0, may be generated, and when the data in each slot is the second class to correspond to the slot order of the mask column, second mask data, which has a value of 1, may be generated, and otherwise, the second mask data, which has a value of 0, may be generated. In this case, the electronic apparatus may add an additional information slot with additional information to each of the generated first mask column or second mask column. Here, the additional information slot may include at least one of the information on the first number of categorical data corresponding to the class corresponding to the mask column, the information on the second number of categorical data not corresponding to the class corresponding to the mask column, and the information on the preset operation processing value for the first number.

Then, the generated first mask data and second mask data may be homomorphically encrypted to generate the first mask column and the second mask column. When the additional information slot is added when generating the mask data, the additional information added to the additional information slot during the above-described homomorphic encryption process may also be homomorphically encrypted.

The homomorphic encrypted message is generated by combining the categorical column and the plurality of mask columns (S740).

Meanwhile, the method of generating a homomorphic encrypted message when only the categorical data exists is described above, but when both the categorical and numerical data exist in one data set, the numeric column corresponding to the numerical data may be generated, and the homomorphic encrypted message that also includes the above-described numeric column may be generated. In this case, the numerical data may also include not only the numerical data for one item, but also the numerical values for the plurality of items. For example, in the case of generating the homomorphic encrypted message for the data set composed of region, age, and annual salary, the homomorphic encrypted message may include a categorical column corresponding to region, a first numeric column corresponding to age, a second numeric column corresponding to annual salary, and a plurality of mask columns corresponding to class types of a region.

As described above, since the method for generating a homomorphic encrypted message according to the present disclosure generates the mask columns corresponding to each of the plurality of classes for one category in the homomorphic encryption process for the categorical data, in the statistical operation process using the specific category, it is possible to perform faster statistical operations by using the corresponding mask column included in the homomorphic encrypted message. The method for generating a homomorphic encrypted message as illustrated in FIG. 7 may be executed on the electronic apparatus having the configuration of FIG. 2, and may also be executed on the electronic apparatus having different configurations.

In addition, the method for generating an encrypted message as described above may be implemented by a program including an executable algorithm that may be executed in a computer, and the above-described program may be stored and provided in a non-transitory computer readable medium.

The non-transitory computer-readable medium is not a medium that stores data therein for a while, such as a register, a cache, a memory, or the like, but means a medium that semi-permanently stores data therein and is readable by a device. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

Figure 8:
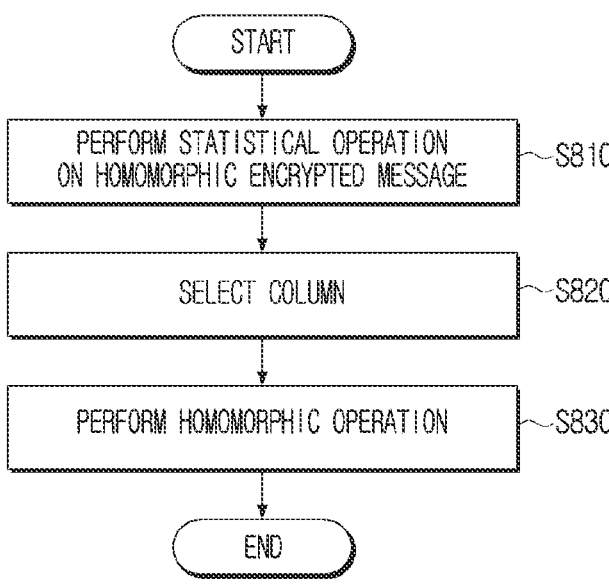
FIG. 8 is a flowchart illustrating another method for processing an encrypted message according to an embodiment of the present disclosure.

FIG. 8 is a flowchart for describing a method for processing an encrypted message according to an embodiment of the present disclosure.

First, the statistical operation command for the homomorphic encrypted message may be received (S810). Specifically, the statistical operation command may be the statistical operation command for the categorical data and numerical data. For example, it may be a statistical operation such as average annual salary in Seoul area, where the Seoul area is categorical data corresponding to a regional category, and the annual salary may be numerical data.

Among the plurality of mask columns, the mask column and numeric column corresponding to the statistical operation command are homomorphically operated to generate the statistical result encrypted message corresponding to the statistical operation command. Specifically, by analyzing the statistical operation command, the category and specific class included in the statistical operation may be confirmed (S820), the mask column corresponding to the class may be confirmed, and the statistical operation may be performed using the confirmed mask column (S830). In order to filter the specific category during this statistical operation process, the categorical column corresponding to the specific class may be used without the need to perform a separate homomorphic comparison operation, so the statistical operation may be performed more quickly. The method for processing an encrypted message as illustrated in FIG. 8 may be executed on the electronic apparatus having the configuration of FIG. 2, and may also be executed on the electronic apparatus having different configurations.

In addition, the method for processing an encrypted message as described above may be implemented by a program including an executable algorithm that may be executed in a computer, and the above-described program may be stored and provided in a non-transitory computer readable medium.

Although exemplary embodiments of the present disclosure have been illustrated and described hereinabove, the present disclosure is not limited to the abovementioned specific exemplary embodiments, but may be variously modified by those skilled in the art to which the present disclosure pertains without departing from the gist of the present disclosure as disclosed in the accompanying claims. These modifications should also be understood to fall within the scope and spirit of the present disclosure.

What is claimed is:

1. An electronic apparatus, comprising:
a memory configured to store at least one instruction and store a plurality of categorical data whose values are expressed as a plurality of classes in a single category; and
a processor configured to execute the at least one instruction to generate the plurality of categorical data into one homomorphic ciphertext,
wherein the processor is configured to:
generate a categorical column in which each homomorphic ciphertext is placed in a respective one of a plurality of slots by homomorphically encrypting each of the plurality of categorical data,
for each of the plurality of classes, generate a mask column in which information indicating whether categorical data of each of the plurality of slots within the categorical data column belongs to a specific class is placed in a slot corresponding to the data among the plurality of slots, and
generate the homomorphic ciphertext by combining the categorical column and the plurality of mask columns.

2. The electronic apparatus of claim 1,
each of the plurality of slots in the mask column has encrypted data indicating whether a class of the corresponding slot in the categorical column is a class corresponding to the mask column.

3. The electronic apparatus of claim 2, wherein the processor is configured to generate plaintext column data using the plurality of categorical data and generate the mask column by homomorphically encrypting the column data.

4. The electronic apparatus of claim 2, wherein the plurality of slots in the mask column include:
a plurality of data slots corresponding to slots in the categorical column; and
one or more additional information slots storing statistical information of the mask column.

5. The electronic apparatus of claim 4, wherein the one or more additional information slots include at least one of information on a first number of categorical data corresponding to the class corresponding to the mask column, information on a second number of categorical data not corresponding to the class corresponding to the mask column, and information on a preset operation processing value for the first number.

6. The electronic apparatus of claim 5, wherein the information stored in the additional information slot is homomorphically encrypted.

7. The electronic apparatus of claim 1, wherein the memory stores numerical data corresponding to each of the plurality of categorical data, and
the processor is configured to generate a numeric column by homomorphically encrypting the numerical data, and generate homomorphic ciphertext by combining the categorical column, the plurality of mask columns, and the numeric column.

8. The electronic apparatus of claim 7, wherein when a statistical operation command for the categorical data and the numerical data is input, the processor is configured to perform a homomorphic operation on a mask column corresponding to the statistical operation command among plurality of mask columns and the numeric column to generate a statistical result encrypted message corresponding to the statistical operation command.

9. A method for generating a homomorphic ciphertext, comprising:
storing a plurality of categorical data whose values are expressed as a plurality of classes in a single category;
generating a categorical column in which each homomorphic ciphertext is placed in a respective one of a plurality of slots by homomorphically encrypting each of the plurality of categorical data;
for each of the plurality of classes, generating a mask column in which information indicating whether categorical data of each of the plurality of slots within the categorical data column belongs to a specific class is placed in a slot corresponding to the data among the plurality of slots; and generating a homomorphic ciphertext by combining the categorical column and the plurality of mask columns.

10. The method of claim 9, each of the plurality of slots in the mask column has encrypted data indicating whether a class of the corresponding slot in the categorical column is a class corresponding to the mask column.

11. The method of claim 10, wherein in the generating of the mask column, plaintext column data is generated using the plurality of categorical data, and the mask column is generated by homomorphically encrypting the column data.

12. The method of claim 10, wherein the plurality of slots in the mask column include:

a plurality of data slots corresponding to slots in the categorical column; and one or more additional information slots storing statistical information of the mask column.

13. The method of claim 12, wherein the one or more additional information slots include at least one of information on a first number of categorical data corresponding to the class corresponding to the mask column, information on a second number of categorical data not corresponding to the class corresponding to the mask column, and information on a preset operation processing value for the first number.

14. The method of claim 13, wherein the information stored in the additional information slot is homomorphically encrypted.

15. The method of claim 9, wherein in the storing, numerical data corresponding to each of the plurality of categorical data is further stored, the method for generating a homomorphic ciphertext further includes generating a numeric column by homomorphically encrypting the numerical data, and in the generating of the homomorphic ciphertext, the homomorphic ciphertext is generated by combining the categorical column, the plurality of mask columns, and the numeric column.

16. The method of claim 15, further comprising:

receiving a statistical operation command for the categorical data and the numerical data; and generating a statistical result encrypted message corresponding to the statistical operation command by performing a homomorphic operation on a mask column corresponding to the statistical operation command among the plurality of mask columns and the numeric column.

17. A non-transitory computer-readable recording medium including a program for executing a method for generating a homomorphic ciphertext, wherein the method comprising:

storing a plurality of categorical data whose values are expressed as a plurality of classes in a single category;

generating a categorical column in which each homomorphic ciphertext is placed in a respective one of a plurality of slots by homomorphically encrypting each of the plurality of categorical data;

for each of the plurality of classes, generating a mask column in which information indicating whether categorical data of each of the plurality of slots within the categorical data column belongs to a specific class is placed in a slot corresponding to the data among the plurality of slots; and generating a homomorphic ciphertext by combining the categorical column and the plurality of mask columns.

* * * * *